Aug. 9, 1949.   J. E. FOUCHAUX ET AL   2,478,689
MULTIPLE-STATION SHIP'S SIGNALING SYSTEM
Filed July 18, 1945   4 Sheets-Sheet 1

INVENTORS
JULIEN E. FOUCHAUX
BY MAXWELL INGRAM
William J Barnes
ATTORNEY

Aug. 9, 1949.          J. E. FOUCHAUX ET AL          2,478,689
              MULTIPLE-STATION SHIP'S SIGNALING SYSTEM
Filed July 18, 1945                              4 Sheets-Sheet 4
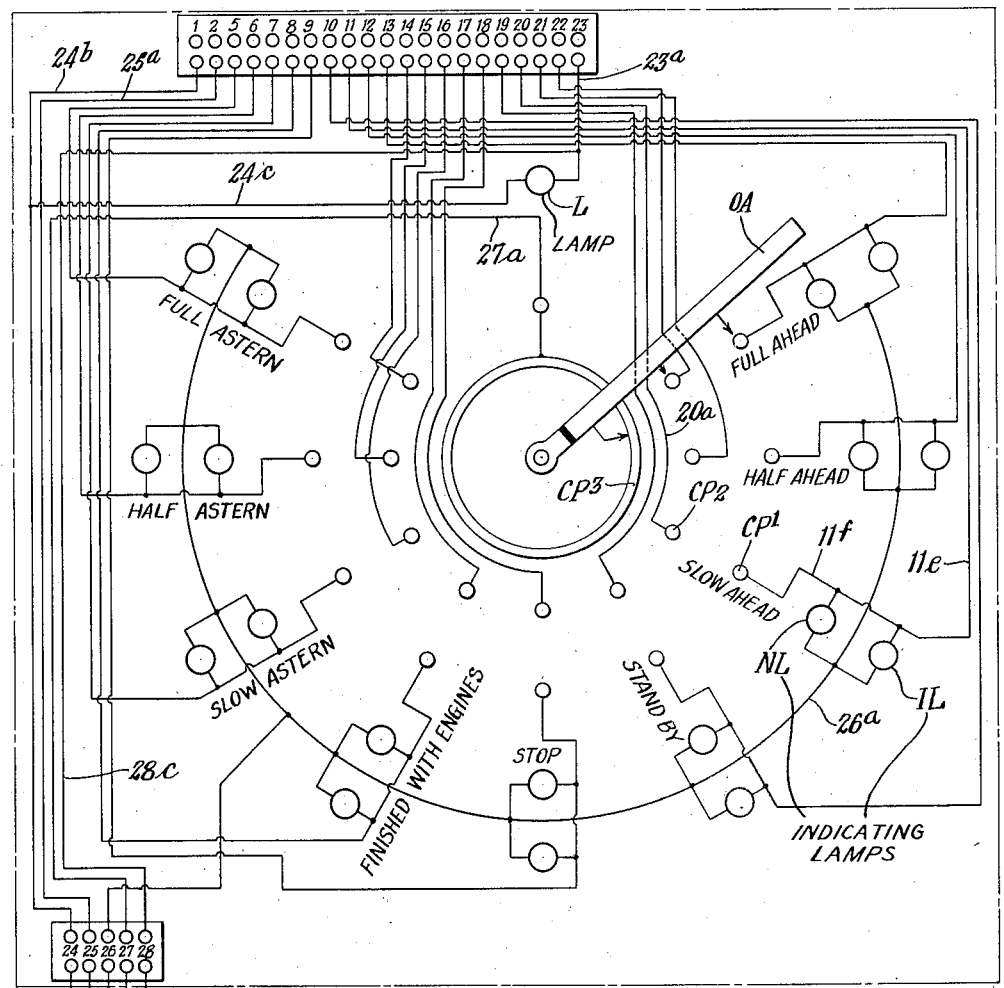
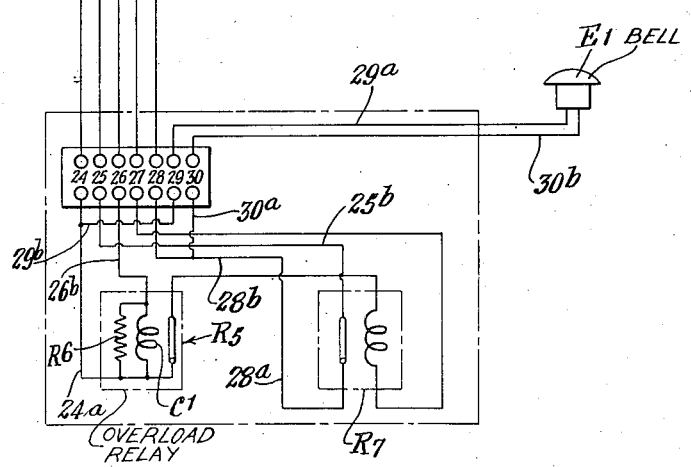
Fig. 4.
INVENTORS
JULIEN E. FOUCHAUX
BY MAXWELL INGRAM
William J. Barnes
ATTORNEY Patented Aug. 9, 1949

2,478,689

UNITED STATES PATENT OFFICE 2,478,689

MULTIPLE-STATION SHIP'S SIGNALING SYSTEM

Julien E. Fouchaux, North Haledon, N. J., and Maxwell Ingram, Brooklyn, N. Y., assignors to Pilot Marine Corporation, New York, N. Y., a corporation of New Jersey Application July 18, 1945, Serial No. 605,712

12 Claims. (Cl. 177—334)

This invention relates to interior communication systems wherein signals, or orders, may be transmitted from one, or more, sending stations to one or more receiving stations, and the acknowledgements of such signals, or orders, conveyed back to the sending stations. The invention as herein described has particular reference to engine order telegraphs for use on shipboard to transmit and acknowledge orders between the bridges, or other signaling positions, and the engine room.

For convenience of description, the present invention is described as it may be used on board ship for the purposes above mentioned, but it will be readily understood that the invention is not to be restricted to such uses since it may be readily used in other kinds of installations.

On board ship it is customary to transmit orders from one, or more, stations on the bridge, or perhaps from an aft steering station, to the engine room, by means of a ship's telegraph, which usually transmits both visual and audible signals whereby the engine, or both port and starboard engines, may be operated in accordance with signals transmitted by the navigating officer. Such response may be referred to as "acknowledgment" of the transmitted orders.

In many types of ships, for example mine planters, it is extremely important that the orders to the engine room be transmitted as promptly as possible, with the utmost accuracy, and that the engine room acknowledge and perform the orders with like promptness and accuracy.

A principal object of the present invention is to provide a signaling system which may include a plurality of transmitting stations on the main bridge, and if desired, on the wing bridges and in an aft steering position, whereby circuit closing means, such as push buttons, may be utilized to transmit signals at very rapid speed to the engine room for control of the engines.

The various transmitting stations are electrically interlocked and indications of transmitted and of acknowledged orders appear simultaneously at all transmitting stations. New orders may be transmitted from any transmitting station without repeating a previous order.

A further object is to provide a system wherein there is no appreciable time lag between the transmission of the signal and its receipt in the engine room, and wherein only the order actually transmitted can be properly acknowledged by the engine room.

A further object is to provide means whereby if two, or more, orders are transmitted simultaneously from different navigating positions on the ship, the audible and visual signals transmitted to the engine room will persist until the new or correct order is transmitted.

Another object is to provide means whereby if two or more signaling locations transmit the same order, the transmission and acknowledgment of that order occur normally just as if the order came from only one location.

Further objects of the invention will be apparent to those skilled in the art from the accompanying description taken in conjunction with the drawings, in which Fig. 1 is a diagrammatic representation of the wiring and terminal layout for a ship installation, including a "center-bridge" station, which may be located at the principal navigation location on the bridge, and "port-bridge" and "starboard-bridge" stations, which may be located on the port and starboard wing bridges respectively. The terminal layout for the "port-bridge" location is shown but it is to be understood that the wiring and terminal layouts for the "center-bridge" and the "starboard-bridge" locations are identical. The terminal boxes for the port and starboard engines are also shown in this figure;

Fig. 4 is a wiring diagram of the telegraph instruments and relay box associated with the port engine controls. Since the wiring diagram for the starboard engine control is similar, it need not be illustrated.

Figure 2:
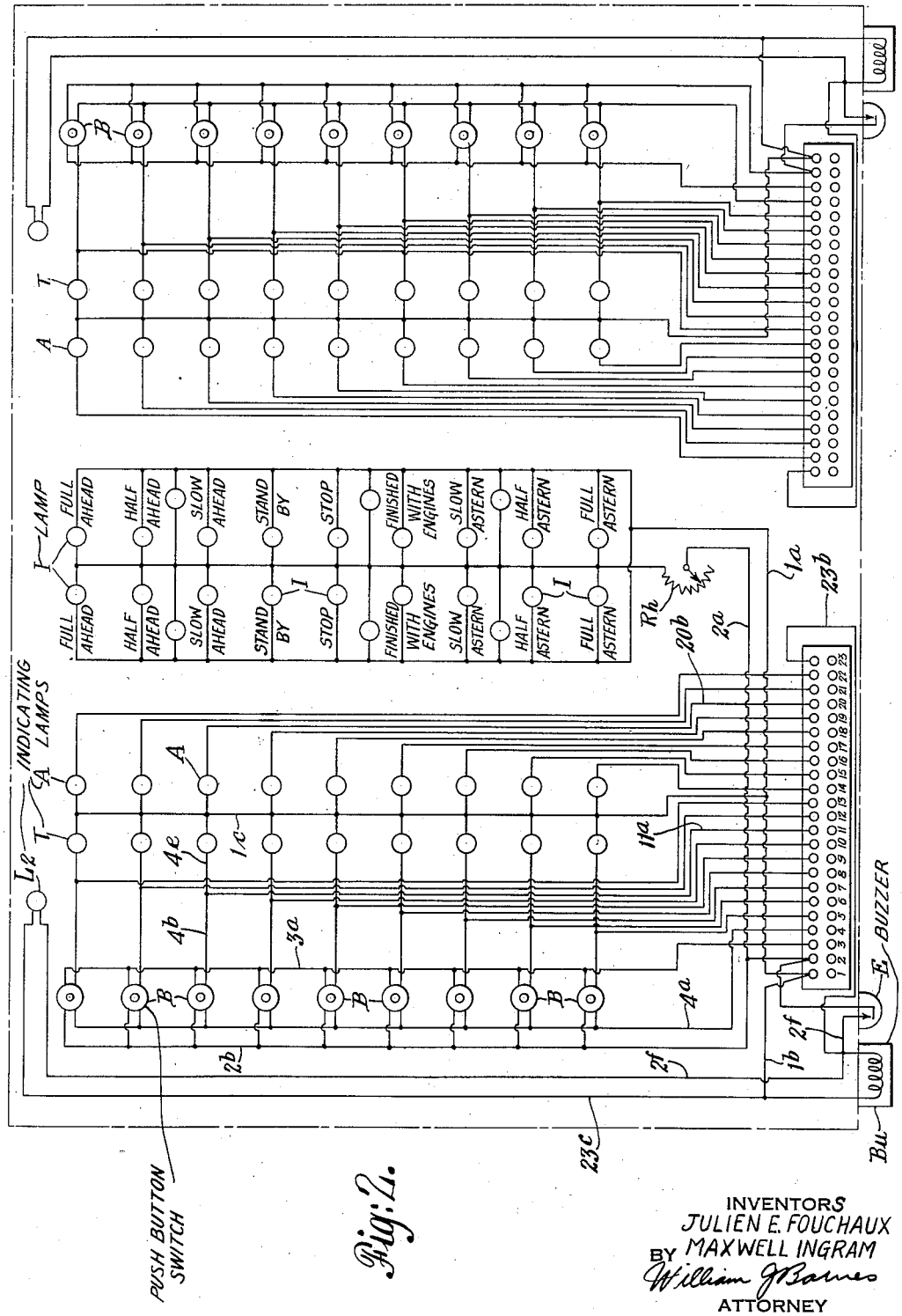
Fig. 2 is a typical wiring diagram for each bridge instrument.

Referring to Fig. 2, the wiring arrangement which is typical of all transmitting instruments, may be described very generally as comprising a series of push buttons represented by the letter B, by means of which various orders, such as "Full Ahead," "Slow Ahead," "Half Astern," etc. may be transmitted to either the port or starboard engines. These push buttons may be, and preferably are, located in a row so as to facilitate the transmission of successive orders and preferably have illuminated dials, or other visual indicators, associated with them bearing the names of their respective orders. As shown in this figure, a series of illuminating lamps I may be used to supply the desired illumination for these order names.

When an order is given, it is desired that there be a visual record of the order having been transmitted and for this purpose either a series of lamps T, annunciators, or other visual indicating devices, are positioned adjacent the push buttons; each such device is energized when its associated push button is depressed. It is also desired that when an order has been acknowledged by the engine room, visual indication thereof should be registered at the signaling positions. Accordingly, the lamps A, annunciators, or other visual indicating devices, are energized whenever the order corresponding to the adjacent push button has been acknowledged by the engine room.

These push buttons, and the associated indicating devices described thus far, may be conveniently mounted on a pedestal, the construction of which need not be further explained since it forms no part of the present invention.

Still referring to Fig. 2, it will be seen that each of the illuminating lamps I is in the circuit which comprises the conductors $1a$ and $2a$ leading respectively to the terminals 1 and 2 of the left-hand terminals. A source of potential, preferably 115 volts D. C., although alternating current may be used if desired, is applied across these terminals and serves to light these lamps, their intensity being controlled by means of a rheostat Rh.

Transmission of orders

The manner in which orders are transmitted may be described in connection with giving the order "Slow Ahead" to the engine room, reference being first had to Fig. 2. As shown in this figure, the "Slow Ahead" push button is the third one from the top, and for convenience the following discussion will be confined to the port engine. All of these push buttons may comprise double-pole, single-throw normally open switches, the uppermost poles of which are connected by the conductor $2b$ to the terminal 2 of the junction block. When this push button is depressed, the upper pole closes the circuit to the conductor $3a$ so the current is transmitted to terminal 3 of the junction box.

Figure 3:
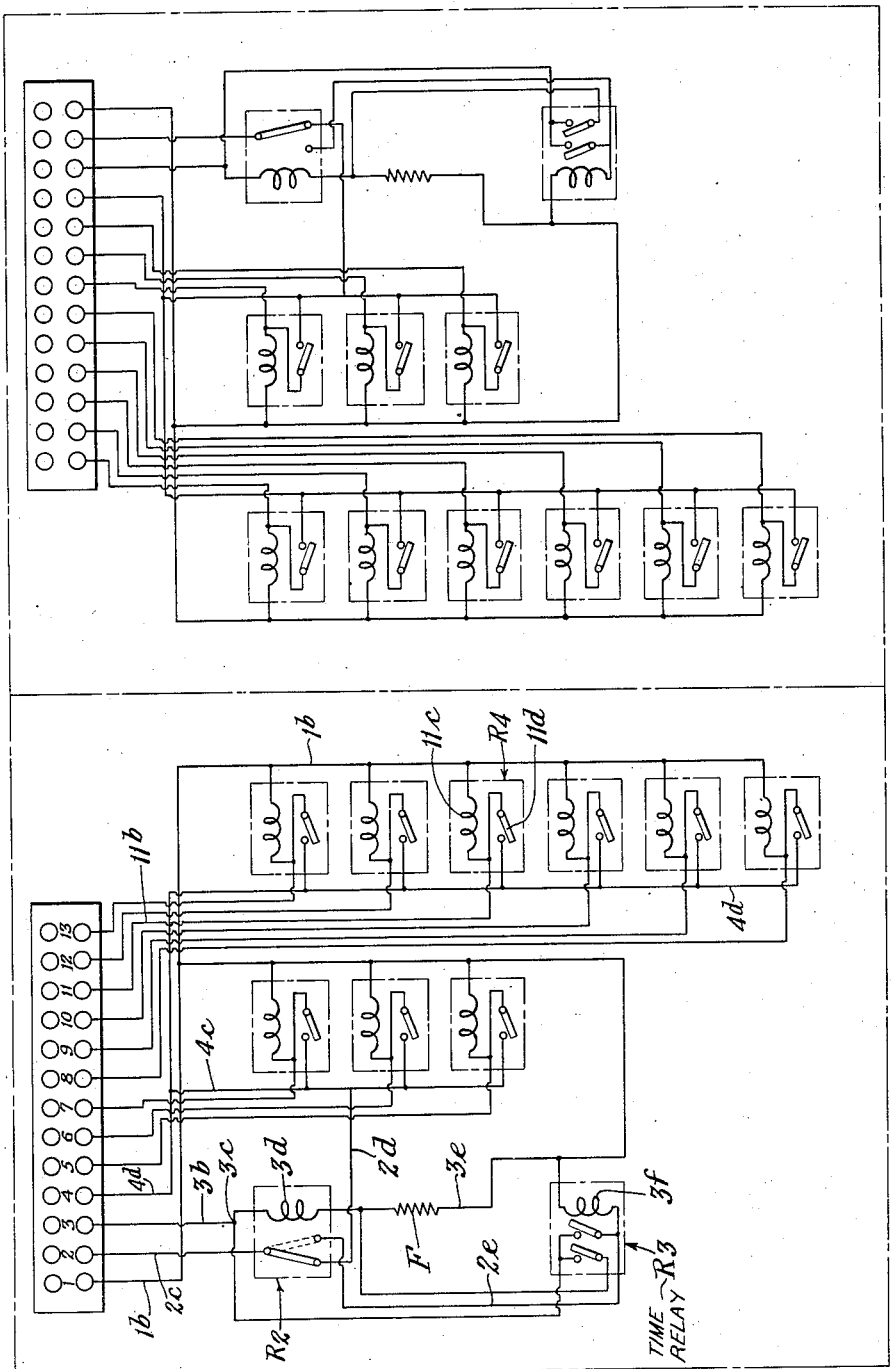
Fig. 3 is a wiring diagram of the port and starboard relay racks, the terminal numbering therein shown corresponding with the numbering shown in the relay rack represented in Fig. 1.

Passing now to Fig. 3, the circuit is traced from terminal 3 of the upper left-hand junction box, through conductor $3b$ to the junction point $3c$. From this junction point, a connection is made to the coil $3d$ of a single-pole, double-throw, normally closed relay indicated generally by the reference character $R^2$. The circuit through the coil $3d$ is completed through resistor F and conductors $3e$ and $1b$, the latter of which is connected to the terminal 1 of the junction block. Terminal 2 is connected by means of conductor $2c$ to the armature of relay $R^2$ and the other terminal of the armature (as shown by the full line position) is connected by conductors $2d$, $4c$ and $4d$ to the armatures of a series of nine relays, which, as hereinafter described, control the circuits associated with the respective orders, delivered to the engine room.

It will be noted that when the coil $3d$ is energized, its armature is drawn to the dotted line position, thereby breaking the circuit between terminal 2 and these nine relays, which has the effect of removing or "wiping out" any previous or "pre-existing" order in the system. This movement of the relay armature closes the circuit from terminal 2 through conductor $2e$ to another relay $R^3$ which is a double-pole, single-throw, normally open, inertia-type time-delay relay. Conductor $2e$ is conected with the coil $3f$ of this relay and thence by means of the conductor $1b$ to the terminal 1. When this coil $3f$ is energized, it closes the two armatures of relay $R^3$ thereby short-circuiting the coil $3d$ of relay $R^2$ which restores the armature of that relay to its normally closed position. Resistance F is inserted in the circuit as shown to limit the current through the armature of $R^3$ and conductor $3e$ to a safe value. Current can now flow from terminal 2 through conductor $2c$, the armature of relay $R^2$, conductors $2d$, $4c$ and $4d$, to the armatures of the nine relays so that a new order may be transmitted.

It will also be noted that current from terminal 2 flows through a portion of the conductor $4d$ to the terminal 4.

Referring back to Fig. 2, and commencing at terminal 4, it will be noted that there is a circuit completed from this terminal through conductor $4a$, the lower pole of the push button B "Slow Ahead," and conductor $4b$, to conductor $11a$ to the terminal 11. Also, current flows from conductor $4b$ through the conductor $4e$, through the lamp T or other visual means, used to indicate the transmission of an order by the system, to the conductor $1c$ and thence to terminal 1.

Figure 1:
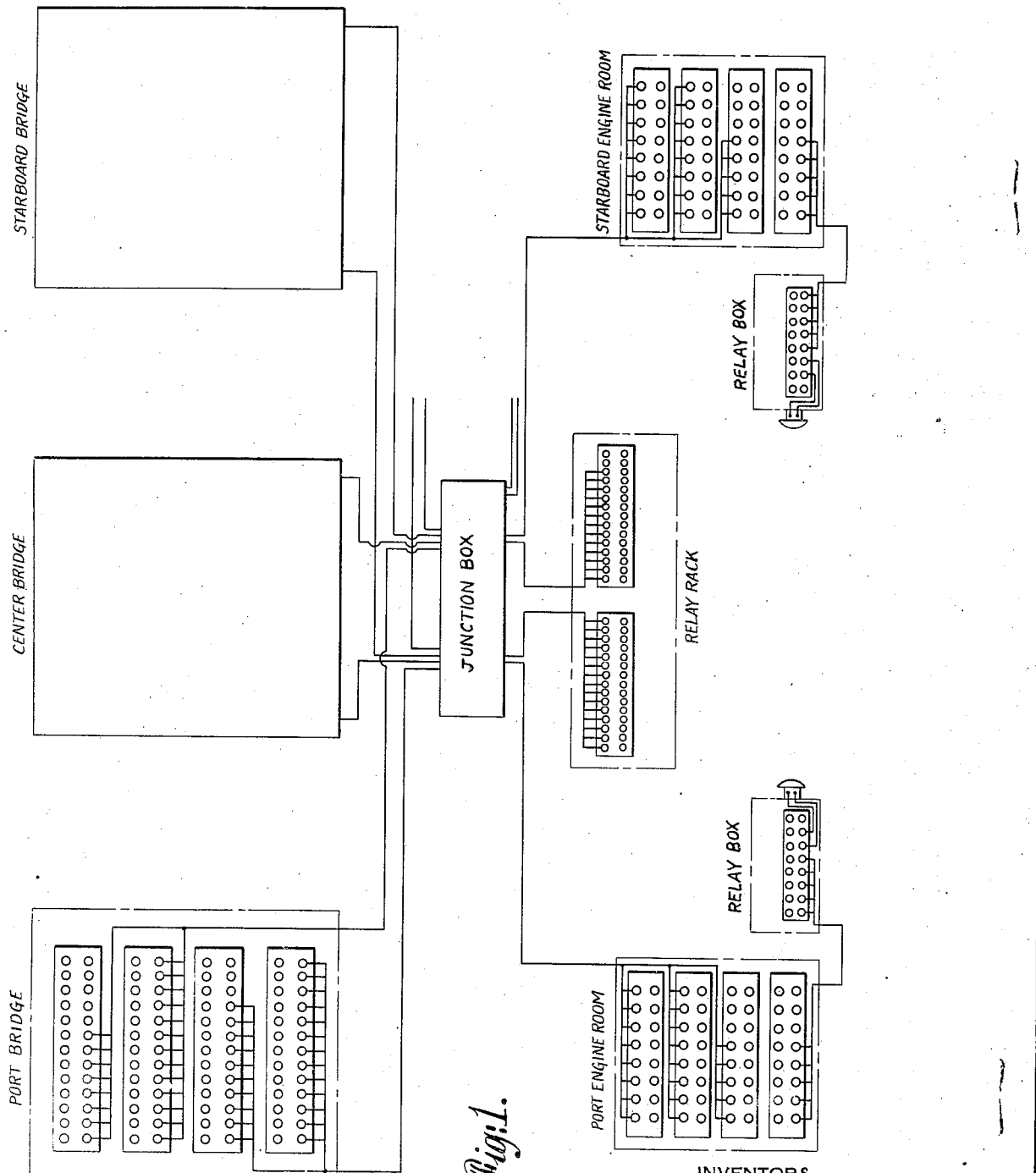

Continuing through junction box shown in Fig. 1, thence to terminal 11 in Fig. 3, the circuit is continued through conductor $11b$ to the "Slow Ahead" relay $R^4$. It also includes the coil $11c$, the conductor $1b$ and terminal 1. When the coil $11c$ is thus energized, its associated armature $11d$, normally open, is closed. Thereafter, current through $4d$ (coming from terminal 2, conductor $2c$, the armature of relay $R^2$, conductors $2d$ and $4c$) may flow through the armature $11d$ and the coil $11c$, thence through conductor $1b$ to terminal 1. This current flowing through the coil $11c$ maintains the armature $11d$ closed, thereby keeping the signal, or order, in existence, (i. e., "maintaining" it) until a different signal is transmitted, at which time, as previously explained, the movement of the relay to the armature of $R^2$ will wipe out this order.

Referring to Fig. 4, the manner in which orders, such, for example, as the "Slow Ahead" order under discussion, are received in the engine room, will now be described.

If desired, the engine room instrument, by means of which the transmitted orders are acknowledged and the engine controlled accordingly, may include a series of push buttons for acknowledging the orders, but, as shown diagrammatically in this figure, it is in the form of an engine room telegraph of more or less conventional type. It comprises a circular dial with an operating handle, or arm, OA, which may be moved into various positions corresponding with the orders to be acknowledged. At each of these positions, the name of the order appears, usually on a glass plate, behind which an indicating lamp IL, which may be of the incandescent type, is located. As a safety measure, a neon lamp, NL, which normally has a longer rated life than the incandescent lamp IL, may be located at each position. These two lamps are connected in parallel between the conductors $11e$ and $26a$. Conductor $11e$ leads from terminal 11 to which current flows when the order "Slow Ahead" has been transmitted, as previously described. Conductor $26a$ leads to the terminal 26 near the lower left-hand corner of the figure. Passing down to the adjoining terminal 26, the circuit is completed through a conductor $26b$, connected to an over-load relay R⁵, thence through coil C¹ and resistance R⁶ of this relay, through conductor 24a to the terminals 24, and thence by conductor 24b to terminal 1. Accordingly, when the "Slow Ahead" signal is transmitted from the bridge instrument, the lamps IL and NL will be lighted, thereby identifying the receipt of this order in the engine room.

It is desirable to have audible, and preferably also visual, indications at each sending station that an order has been transmitted, and such indicators preferably remain in operation or energized, until the order has been acknowledged by the engine room.

For this purpose, the bridge instrument has associated with it, as shown in the extreme lower left-hand corner of Fig. 2, a buzzer Bu, and as shown in the upper left-hand portion, a lamp, or other visual indicator, L². Current for these bridge indicators is derived from the current which identified the transmitted order in the engine room, as above described, in the following manner: Referring first to Fig. 4, a part of the current flowing in conductor 24b is diverted through conductor 24c, lamp L, and conductor 23a, to terminal 23. Referring now to Fig. 2, it will be seen that terminal 23 is connected by a conductor 23b to the coil of the buzzer Bu and that the opposite end of this coil is connected by the conductors 23c and 1b to terminal 1. The lamp L² is lighted by the circuit which includes conductors 23b, 2f, the lamp, and conductor 1b which returns to terminal 1.

In this manner, current which identifies the transmitted order received in the engine room is used to indicate at the sending station that an order has been transmitted, although the particular order is not identified by the means just described.

It is also desirable to have attention attracting means in the engine room to indicate when an order has been transmitted by the system. Preferably these means are both audible, such as a bell E', shown in Fig. 4, and visual, such as the lamp L, which may be colored to attract attention more readily.

The circuit which energizes the bell E' may be traced as follows: Starting at terminal 2, the circuit includes conductor 25a, terminals 25, conductor 25b, the armature of a normally closed, single-pole, single-throw relay R⁷, conductor 28a, conductor 30a, terminal 30 and conductor 30b (leading to the bell), conductor 29a, terminal 29, conductor 29b, terminals 24, and conductor 24b leading to terminal 1.

The circuit for the lamp L includes a substantial part of the circuit just described for the bell and may be referred to specifically beginning at the point in the relay box where conductors 28a and 30a are joined. From there the circuit includes conductor 28b, terminals 28, conductor 28c, the lamp L, conductor 24c and conductor 24b leading to terminal 1.

*Acknowledgment of orders*

The arm OA of the engine room telegraph instrument has a series of contact points indicated by arrows which are adapted to contact two arcuate series of contact points, such as CP¹ and CP² and slip-ring CP³, the outermost of which, CP¹, is connected with the identifying lamp circuit IL—NL already referred to, by means of the conductor 11f. Another portion of the arm OA has a conductor 27a connected to the terminal 27. Assume that the "Slow Ahead" order has been transmitted as described above. As long as the arm OA remains in a position where it does not come in contact with the contact points CP¹ and CP², corresponding to the order "Slow Ahead," it is impossible for the signal to be acknowledged. But when the arm OA is moved to the "Slow Ahead" position, current from the contact point CP¹ flows through the arm OA, thence through slip-ring CP³ and conductor 27a, terminals 27, conductor 27b to the coil of the relay R⁷. This energizes the armature of the relay, causing it to interrupt the current flowing through the conductor 28a. As previously described, current flowing through conductor 28a flows both to the bell E¹' and the indicating lamp L, causing them to function when an order has been transmitted. Interruption of this current therefore causes both the bell E' and lamp L to cease to function thereby indicating in the engine room that the order has been acknowledged. At the same time this interruption of current in conductor 28a, and hence in conductor 28c, interrupts the current in conductor 23a which operated the audible and visual transmission indicating devices at the sending station. Accordingly, these devices are also rendered inoperative thereby indicating to the navigating officer that an order has been acknowledged, although the means just discussed do not identify the particular order. Such identification is obtained as follows:

With the arm OA in the "Slow Ahead" position, it also contacts the contact point CP² connected by the conductor 20a leading to the terminal 20. Referring now to Fig. 2 and commencing at terminal 20, a conductor 20b leads to the acknowledgment lamp A in the "Slow Ahead" position, causing the lamp to be illuminated or, if an annunciator be used, causing it to indicate an acknowledgment of the transmitted order, the circuit being completed through conductor 1c to terminal 1.

Since current from the transmitted order originating at the sending station is used for the reply back, or acknowledgment, it will be readily understood that only the transmitted order can be acknowledged on this system.

When an order is transmitted from one location, or navigating position on the ship, it is desirable to have an indication of that order, and also the subsequent acknowledgment, appear at each of the other transmitting positions. Means are provided for doing this, as will appear from Figs. 1 and 2. The circuit arrangements at each sending station are similar and from each of these positions, conductor cables are connected to a junction box shown in Fig. 1 directly below the "Center-Bridge" position, so that all the sending positions are connected in parallel and the transmission and acknowledgment of orders appear simultaneously at all sending positions.

In the event that the navigating officer should transmit two orders simultaneously by pushing two buttons at his station, or if the officers at two different sending stations should push two different orders simultaneously, means are provided whereby it is impossible for the engine room to silence the attention bells, or to render the visual indicating means inoperative. This safeguard is accomplished by means of the overload relay R⁵ shown in Fig. 4. The coil C¹ and the resistance R⁶ of this relay are so selected that whenever current in excess of the current from a single combination of indicating lamps IL and NL, i. e., from more than one order position, passes through this coil and resistance, the armature of the relay is opened. This interrupts the current through the conductor 24d and the coil of the relay R⁷. In other words, this coil cannot actuate its associated armature, which is the only means by which current to the bell E' and indicating device L (and also to the indicating means on the bridge) can be interrupted. Even if the engine room operator were to move the operating arm OA to either of the two orders thus simultaneously transmitted, he could not de-energize the order indicating means.

To rectify the transmission of two different orders simultaneously, the navigating officer simply transmits the correct current order thereby wiping out the pre-existing orders and transmitting the correct, or desired, order.

It is customary to have additional, or auxiliary, signalling means between the bridge and the engine room by means of which orders for changes in speed, etc. may be transmitted without affecting an order existing in the telegraph system above described. Such means, which preferably include visual and audible signals at both the sending and receiving stations, may be conveniently associated with this system, as shown more particularly in Figs. 2 and 4.

Referring to Fig. 2, these auxiliary signals are transmitted by means of a pushbutton E shown in the extreme lower left-hand part of this figure. When this button is pushed, the circuit may be traced as follows: beginning at terminal 2 on the lower terminal strip, the circuit is completed through the push button E, conductor 2f, the lamp, or other indicator, L² and conductor 1b leading to terminal 1. A portion of the current flowing through conductor 2f also passes through the coil of the buzzer Bu and returns through the conductor 1b to terminal 1. Thus, at the bridge instrument, both the lamp, or other indicator, L² and the buzzer Bu are operated when the pushbutton E is closed.

At the same time current through the pushbutton E flows through conductor 23b to terminal 23. Now referring to Fig. 4 it will be seen that current from terminal 23 can flow through conductor 23a and the indicating lamp, or other indicating device, L, thence through conductor 24c which is connected to terminal 1 in the upper terminal strip. The bell E' shown in the lower part of Fig. 4 is also operated, its circuit being closed when the circuit is completed between terminals 1 and 2. These terminals are connected respectively with terminals 24 and 25. Beginning at the latter, the circuit may be traced as follows: Conductor 25b, the armature of relay R⁷, conductor 28a, conductor 30a, terminals 30, conductor 30b, bell E', conductor 29a, terminals 29, conductor 29b to terminals 24. Thus the closing of the pushbutton E at the sending station operates both the signal lamp, or other indicator, L, and the bell E' in the engine room.

It is to be understood that the invention herein described is not limited to the exact arrangements referred to since various modifications may be made by those skilled in the art without departing from the spirit and scope of the invention.

We claim:

1. A telegraph system comprising a sending station from which a series of orders is to be transmitted, circuit closing means associated with each order, means at the sending station indicating orders transmitted therefrom, a receiving station at which a corresponding series of orders is to be received, means at the receiving station indicating order transmissions from the sending station, means for acknowledging received orders and means at both the sending and receiving stations indicating order acknowledgments.

2. A telegraph system comprising a sending station from which a series of orders is to be transmitted, circuit closing means associated with each order, means at the sending station indicating orders transmitted therefrom, means at the sending station identifying each transmitted order, a receiving station at which a corresponding series of orders is to be received, means at the receiving station indicating and identifying each order transmitted by the sending station, means for acknowledging the received orders, means at both the sending and receiving stations indicating order acknowledgments.

3. A telegraph system comprising a sending station from which a series of orders is to be transmitted, independent circuit closing means associated with each order, means at the sending station identifying each transmitted order, a receiving station at which a corresponding series of orders is to be received, means for acknowledging the received orders and means at the sending station identifying each acknowledged order.

4. A telegraph system comprising a sending station from which a series of orders is to be transmitted, circuit closing means associated with each order, a receiving station at which a corresponding series of orders is to be received, means at the receiving station indicating order transmissions, means at the receiving station identifying each received order, means for acknowledging the received orders, and means at the receiving station indicating order acknowledgments.

5. A telegraph system comprising a sending station from which a series of orders is to be transmitted, circuit closing means associated with each order, means at the sending station identifying each transmitted order, a receiving station at which a corresponding series of orders is to be received, means at the receiving station indicating order transmissions, means at the receiving station identifying each received order, means for acknowledging the received orders and means at the receiving station indicating order acknowledgments.

6. A telegraph system comprising a sending station from which a series of orders is to be transmitted, circuit closing means associated with each order, means at the sending station identifying each transmitted order, a receiving station at which a corresponding series of orders is to be received, means at the receiving station indicating order transmissions, means at the receiving station identifying each received order, means for acknowledging the received orders, means at the sending station identifying each acknowledged order and means at the receiving station indicating order acknowledgments.

7. A telegraph system comprising a sending station from which a series of orders is to be transmitted, circuit closing means associated with each order, means at the sending station indicating order transmissions, means at the sending station identifying each transmitted order, a receiving station at which a corresponding series of orders is to be received, means at the receiving station indicating order transmissions, means at the receiving station identifying each received order, means for acknowledging the received orders, means at both the sending and receiving stations indicating order acknowledgments, and means at the sending station identifying each acknowledged order.

8. A telegraph system comprising a sending station from which a series of orders is to be transmitted, circuit closing means associated with each order, means at the sending station identifying each transmitted order, a receiving station at which a corresponding series of orders is to be received, means for acknowledging the received orders, and means at both the sending and receiving stations indicating order acknowledgments.

9. A telegraph system comprising a sending station from which a series of orders is to be transmitted, independent circuit closing means associated with each order, means at the sending station indicating order transmissions, means for maintaining transmitted orders until a new order is given, a receiving station at which a corresponding series of orders is to be received, means for acknowledging the received orders and means at the sending station indicating order acknowledgments.

10. A telegraph system comprising a sending station from which a series of orders is to be transmitted, circuit closing means associated with each order, a receiving station at which a corresponding series of orders is to be received, means at the receiving station indicating order transmissions, means for removing pre-existing orders substantially simultaneously at the sending and receiving stations, means for acknowledging the received orders and means at the receiving station indicating order acknowledgments.

11. A telegraph system comprising a sending station from which a series of orders is to be transmitted, circuit closing means associated with each order, means at the sending station indicating order transmissions, means at the sending station identifying each transmitted order, means for maintaining transmitted orders until a new order is given, a receiving station at which a corresponding series of orders is to be received, means at the receiving station indicating order transmissions means for removing pre-existing orders substantially simultaneously at the sending and receiving stations, means for acknowledging the received orders and means at both the sending and receiving stations indicating order acknowledgments.

12. A telegraph system comprising a sending station from which a series of orders is to be transmitted, means for illuminating each order, independent circuit closing means associated with each order, means at the sending station identifying each transmitted order, a receiving station at which a corresponding series of orders is to be received, means for acknowledging the received orders and means at the sending station identifying each acknowledged order.

JULIEN E. FOUCHAUX.
MAXWELL INGRAM.

REFERENCES CITED

The following references are of record in the file of this patent:

UNITED STATES PATENTS

| Number | Name | Date |
|---|---|---|
| 560,212 | Herzog | May 19, 1896 |
| 589,746 | Owen et al. | Sept. 7, 1897 |
| 1,025,488 | Street | May 7, 1912 |
| 1,367,583 | Bobroff | Feb. 8, 1921 |
| 1,419,708 | Wood | June 13, 1922 |
| 2,368,300 | Heist | Jan. 30, 1945 |